(12) United States Patent
Chou et al.

(10) Patent No.: US 7,379,050 B2
(45) Date of Patent: May 27, 2008

(54) INPUT DEVICE

(75) Inventors: Chin-Wen Chou, Taipei Hsien (TW); King-Long Lee, Taipei Hsien (TW)

(73) Assignee: Zippy Technology Corp., Hsin Tien, Taipei Hsien (TW)

( * ) Notice: Subject to any disclaimer, the term of this patent is extended or adjusted under 35 U.S.C. 154(b) by 649 days.

(21) Appl. No.: 10/960,042

(22) Filed: Oct. 8, 2004

(65) Prior Publication Data

US 2006/0077173 A1  Apr. 13, 2006

(51) Int. Cl.
*G09G 5/08* (2006.01)
(52) U.S. Cl. ...................................... 345/163; 345/156
(58) Field of Classification Search ................ 345/156, 345/163–166
See application file for complete search history.

(56) References Cited

U.S. PATENT DOCUMENTS

| 6,188,389 | B1 | 2/2001 | Yen |
| 6,700,564 | B2 | 3/2004 | McLoone et al. |
| 7,079,110 | B2 * | 7/2006 | Ledbetter et al. ........... 345/156 |

\* cited by examiner

*Primary Examiner*—Duc Q Dinh
(74) *Attorney, Agent, or Firm*—Muncy, Geissler, Olds & Lowe, PLLC (57) ABSTRACT

An input device adopts a low cost and simple terminal design to replace the conventional grating and instruction switch structures that are costly and complicated. The input device includes a braced rotary member turnable, tiltable leftwards and rightwards, and movable upwards and downwards for selected displacements and an instruction mechanism located within the displacements to receive forces and be driven by the rotary member to generate instructions. The instruction mechanism has abutting mechanical terminals to contact with each other to generate instruction signal output.

16 Claims, 13 Drawing Sheets

INPUT DEVICE

FIELD OF THE INVENTION

The present invention relates to an input device and particularly to an input device for generating instruction signals to perform control functions such as scrolling pictures on a display screen, jumping out of the instruction window to select fast instructions.

BACKGROUND OF THE INVENTION

In the scroll mouse now being commonly used, there is a wheel located between the left and the right keys to enable users to directly skip pages or text lines through rotation of the wheel when reading lengthy texts (such as novels or presentation data) without depressing the page down key on the keyboard or moving the mouse and cursor to the scroll bar on the right side of the screen and depress the left key to execute page down or line skip operation. Namely, the wheel can replace the scroll bar function on the right side of the screen to make user operation easier.

Figure 1:
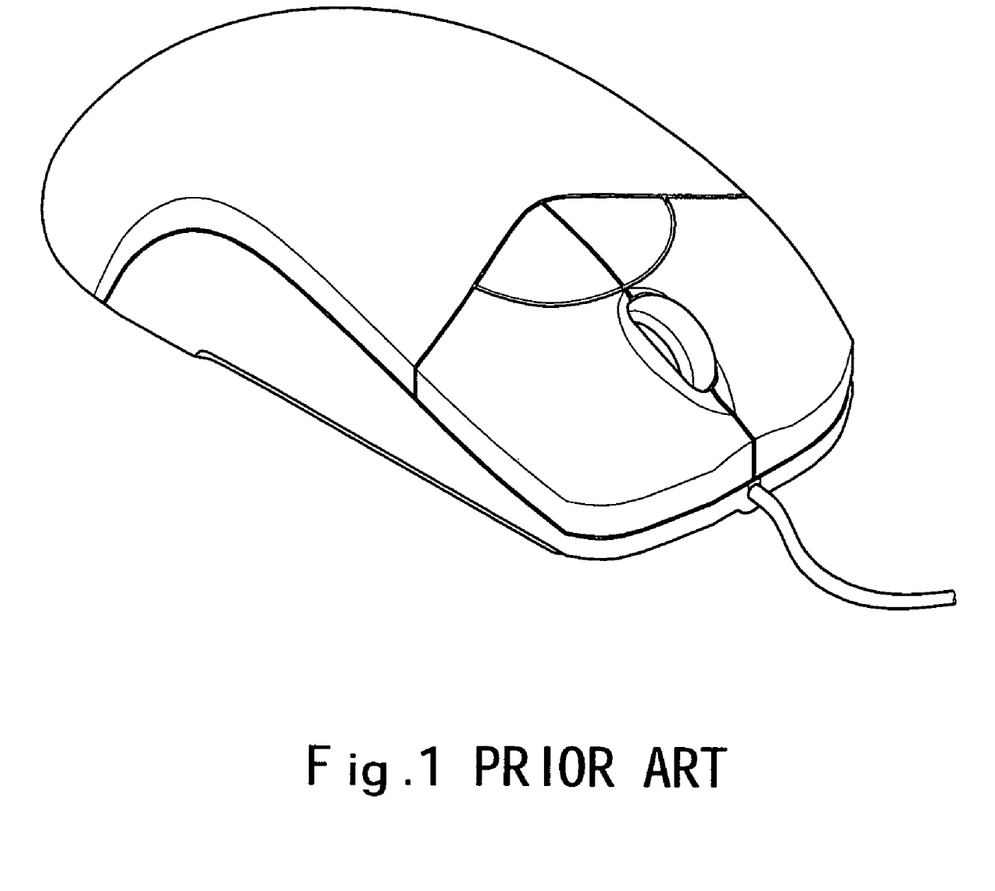
FIG. 1 is a perspective view of a conventional mouse.
Figure 2:
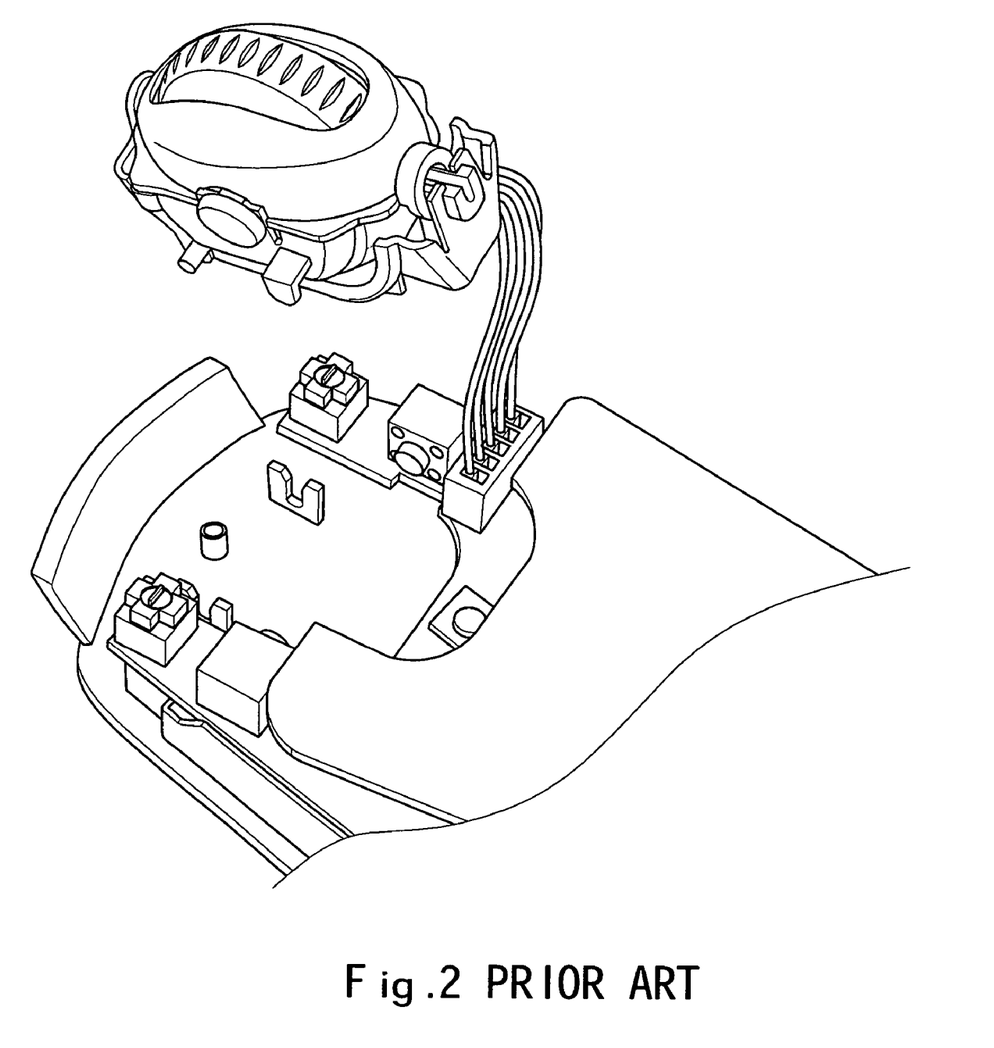
FIG. 2 is a perspective view of another conventional mouse.

Refer to FIG. 1 for an improved mouse design proposed by Applicant. It provides an improved scroll bar function on the screen that not only has a longitudinal up and down movement on the right side, also has a scroll bar design on the lower side of the screen to provide leftward and rightward transverse movements. It is applicable to table listing software such as EXCEL or ACCESS or Web pages. However, for lengthy table fields, scroll bar operation and control cannot fully meet requirements. The general keyboard also does not have corresponding keys to provide transverse movement function. Users have to move the mouse to the scroll bar and depress the left key to operate. Such a design does not fully exploit the advantages of the wheel. Therefore the present invention aims to provide a design that directly uses the wheel of the mouse, and the left and right keys, and left and right direction keys to output switch ON/OFF signals to move the mouse cursor to a desired location for execution or viewing without moving the mouse FIG. 2 shows another conventional design disclosed by Microsoft Co. It is a mouse equipped with a tilt wheel. The product includes a sway seat to couple with a wheel. The sway seat may be moved with the wheel to the left and right side to touch button switches located on two sides of the sway seat to output corresponding instructions. Adding the sway seat makes design and fabrication more complicated. And the size of the mouse cannot be shrunk because of addition of the sway seat and the button switches. It is suitable only for large mouse products.

Based on the two cited references mentioned above, it is clear that the industry at present still mainly focuses on the button switches to generate output signals. The button switch is more expensive. Moreover, with the prevailing product trend that requests lean and light, adding the button switch is against this trend in terms of the mouse size. Hence at present only the medium and large mouses adopt such a design. It also cannot be adapted to the keyboard or remote control device that also has a wheel. Because the location to accommodate the wheel is even more constrained on the keyboard and remote control device. Therefore to develop a small size, low cost and easy to fabricate wheel and instruction switch is one of the main design focuses in the industry.

There are other examples such as U.S. Pat. No. 6,700,564 which achieves picture scrolling function on the screen through pressure sensing. U.S. Pat. No. 6,188,389 adopts a grating switch to detect rotation of the wheel to scroll the picture. Those two references still employ the conventional design by using photoelectric switches. The cost is higher and the required space is larger. Thus they also do not coincide with the current trend that demands lean and light.

SUMMARY OF THE INVENTION

Therefore the primary object of the present invention is to resolve the aforesaid disadvantages. The present invention aims to provide a low cost and easy to assemble terminal design to replace the conventional grating switches and instruction switches that are costly and complicated. The input device according to the invention includes a braced rotary member which is turnable, tiltable leftwards and rightwards, and movable upwards and downwards for selected displacements, and an instruction mechanism located within the moving displacements of the rotary member to receive forces and be driven to generate instructions. The instruction mechanism has abutting mechanical terminals to contact with each other to generate instruction signal output.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 3:
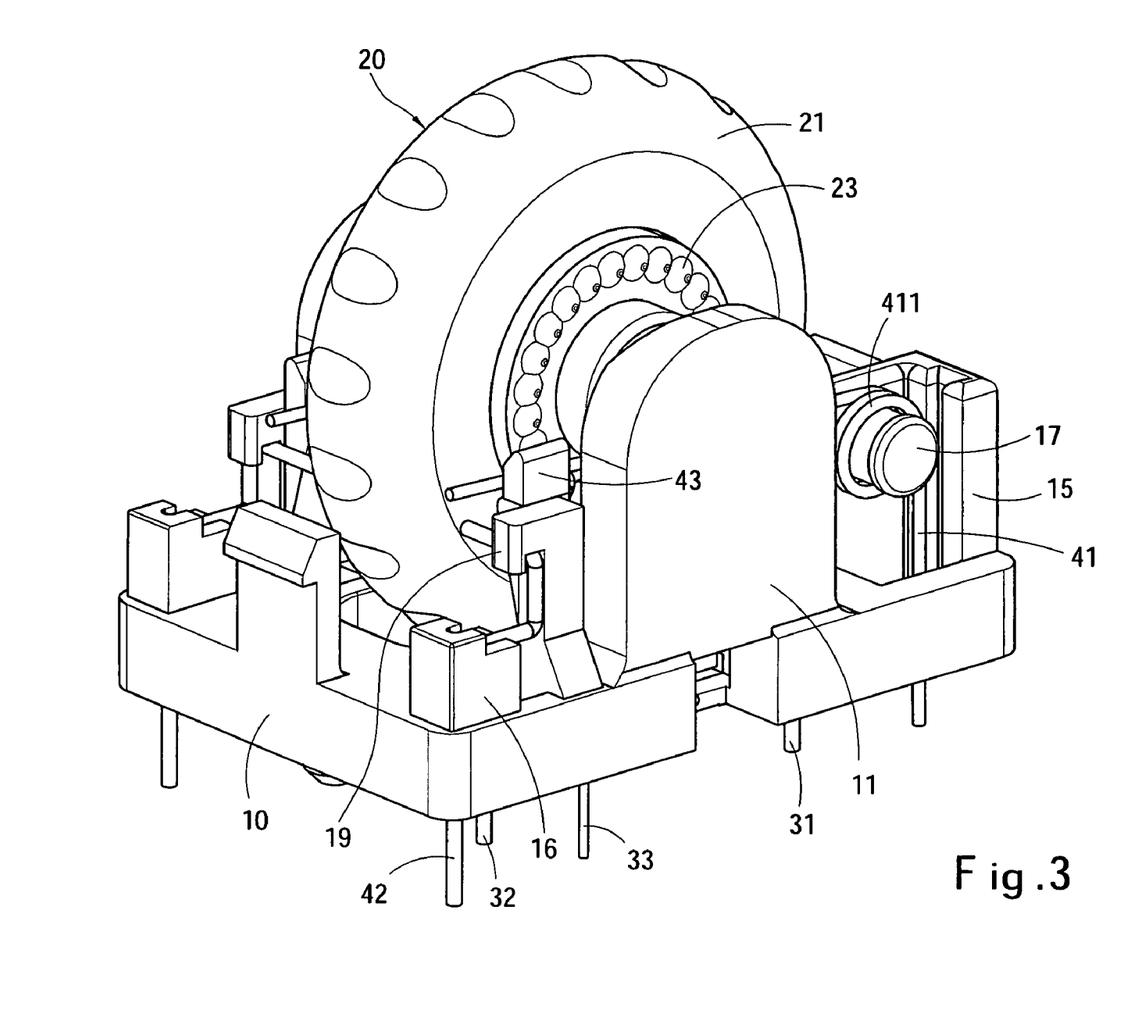
FIG. 3 is a front perspective view of the invention.
Figure 4:
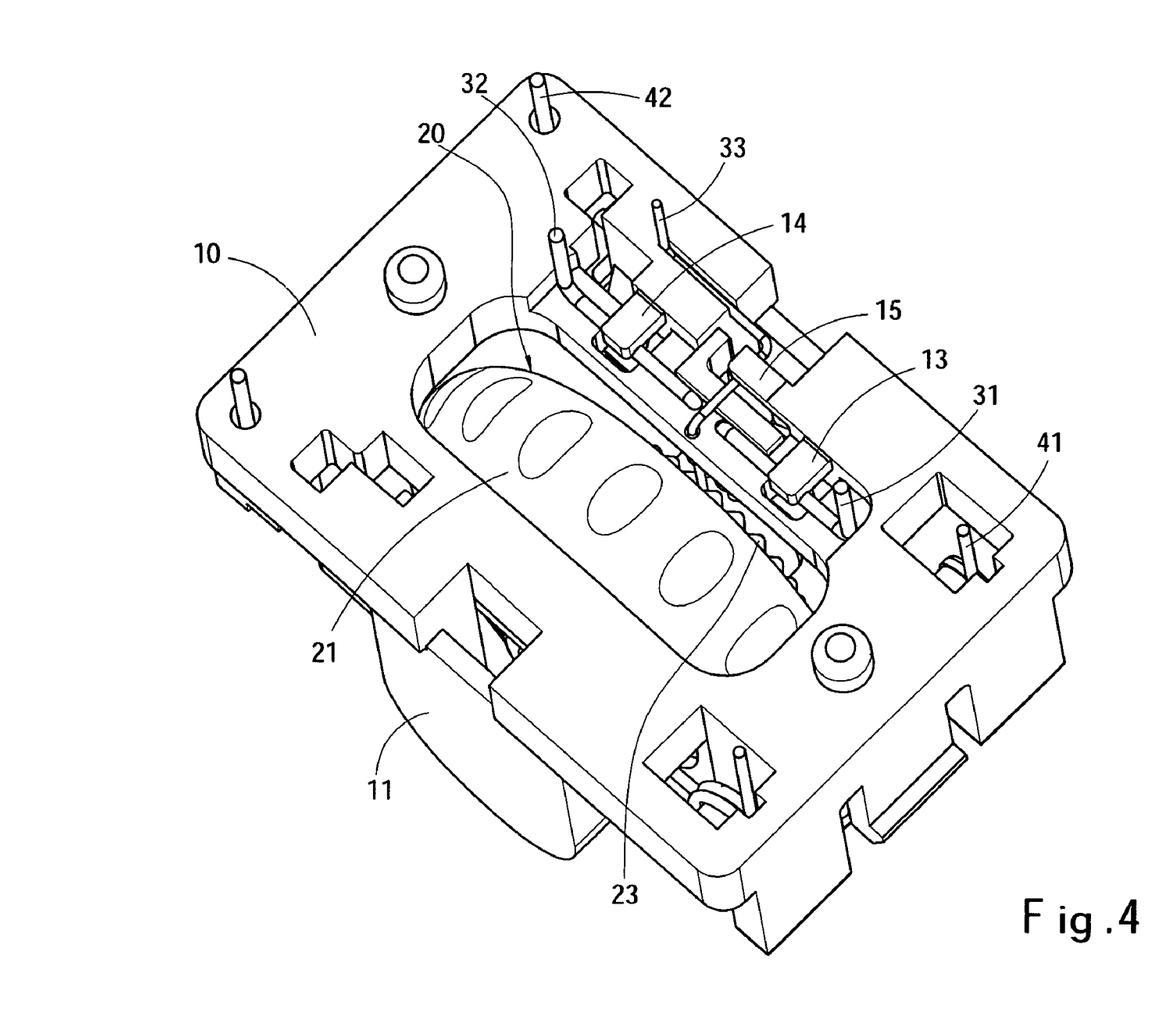
FIG. 4 is a bottom perspective view of the invention.
Figure 5:
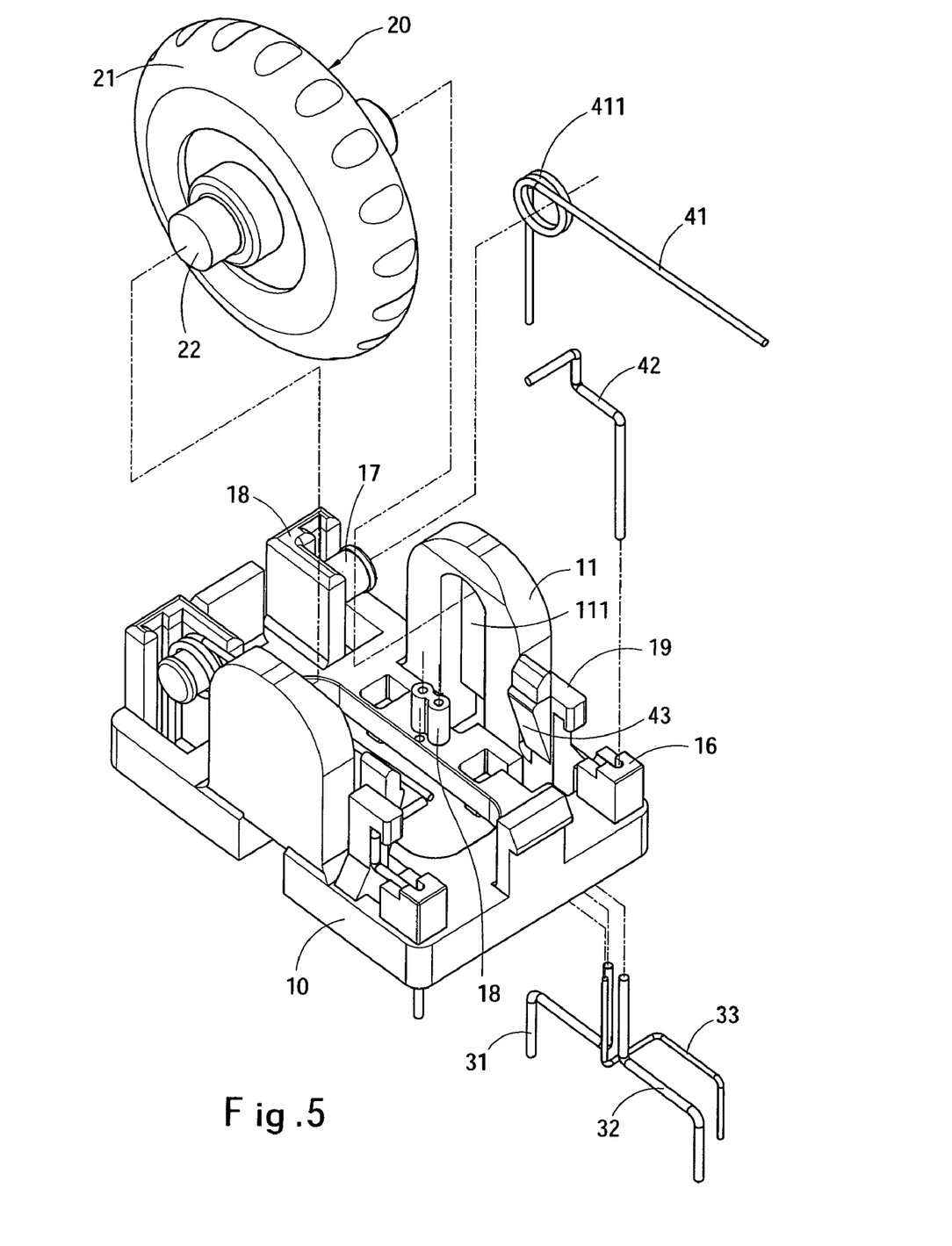
FIG. 5 is an exploded view of the invention.
Figure 9:
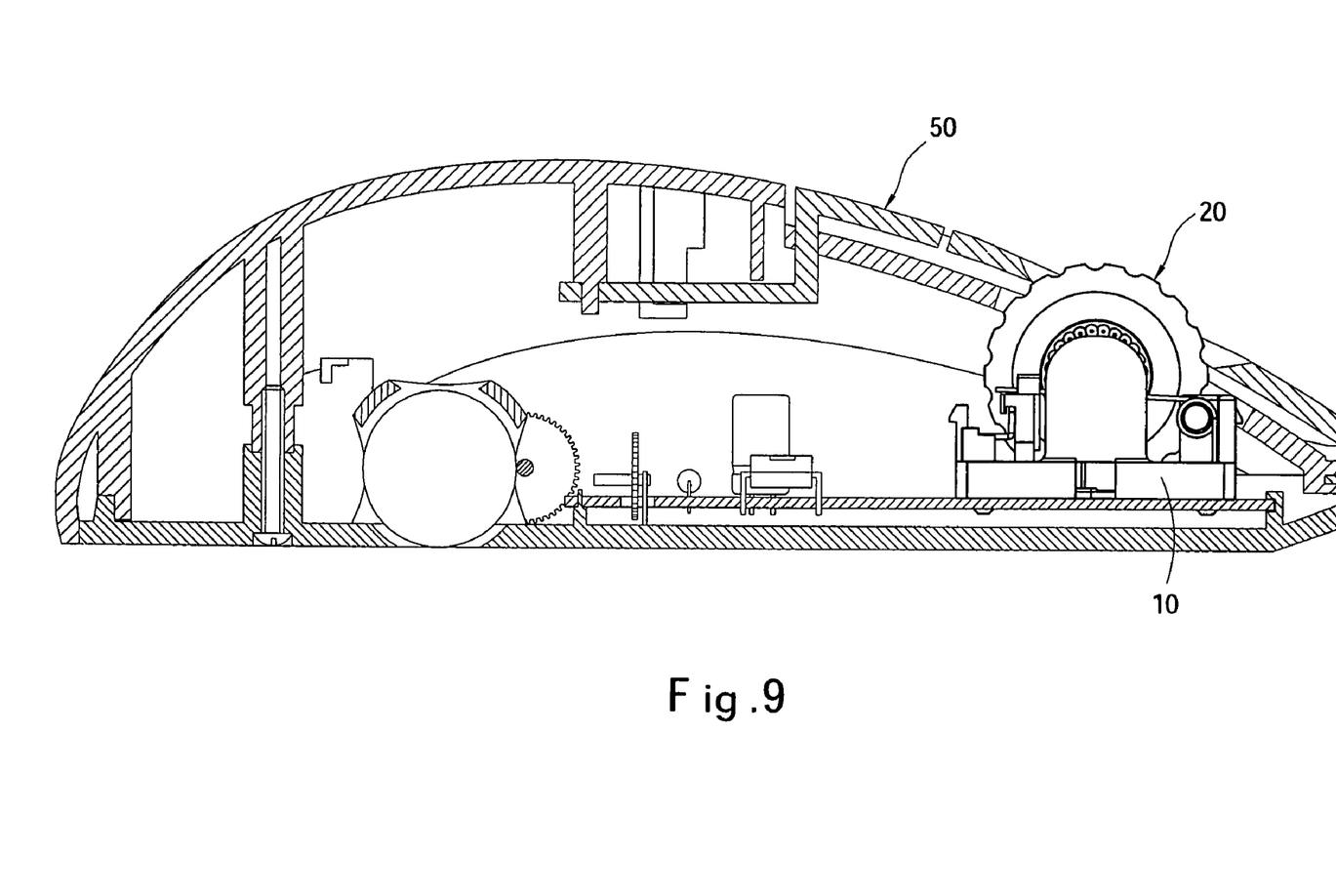
FIG. 9 is a schematic view of an embodiment of the invention adopted on a mouse.
Figure 10:
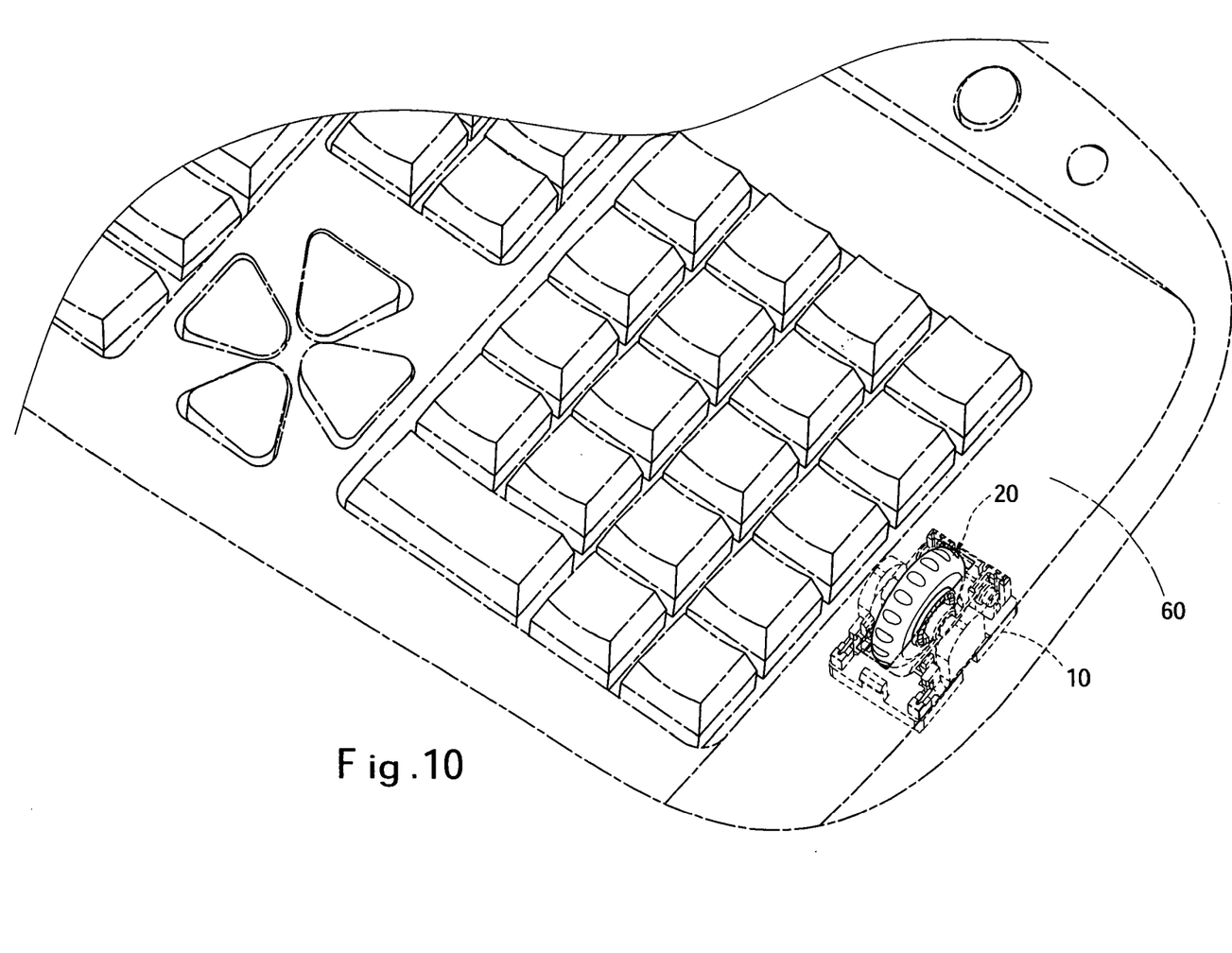
FIG. 10 is a schematic view of another embodiment of the invention adopted on a keyboard.

Please referring to FIGS. 3, 4 and 5, the present invention is adopted for use on an electronic input equipment such as a mouse 50 shown in FIG. 9 or a keyboard 60 shown in FIG. 10 that are electronic products to input instructions. It includes a bracing seat 10, a rotary member 20 located above the bracing seat 10 and turnable, tiltable leftwards and rightwards, and movable upwards and downwards relative to the vertical bracing seat 10 for selected displacements, and a terminal instruction mechanism mounted on the bracing seat 10 and extended into the displacements of the rotary member 20 to receive forces and move. The terminal instruction mechanism has at least two abutting terminals corresponding to the displacements of the rotary member 20 to contact with each other to generate instruction signal output.

The rotary member 20 includes a wheel 21 and an axle 22 running through the wheel 21. The bracing seat 10 has two holding sections 11 to hold the axle 22 and a movable trough 111 which has a closed top end.

Figure 6:
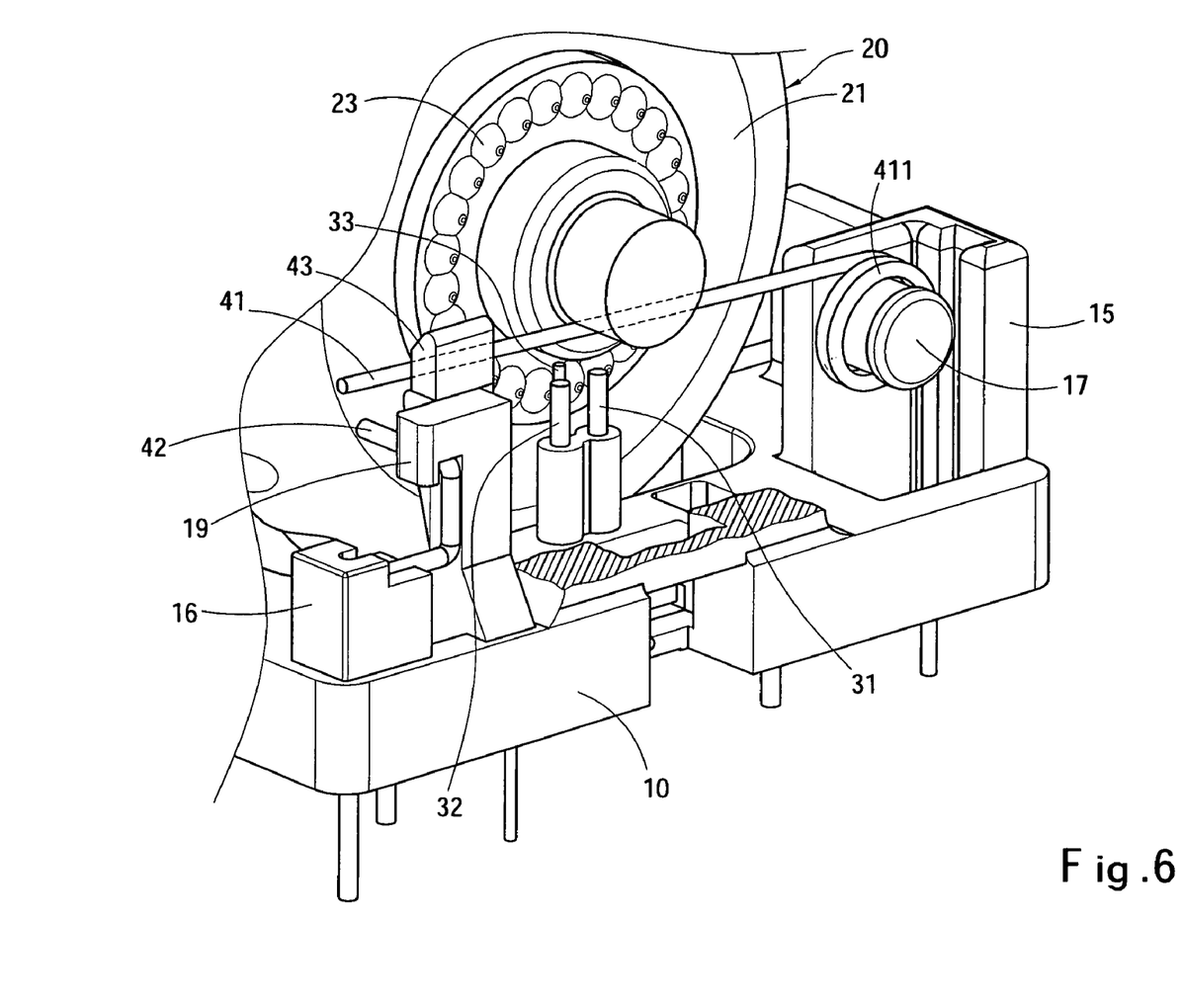
FIG. 6 is a fragmentary perspective view of the invention.
Figure 7A:
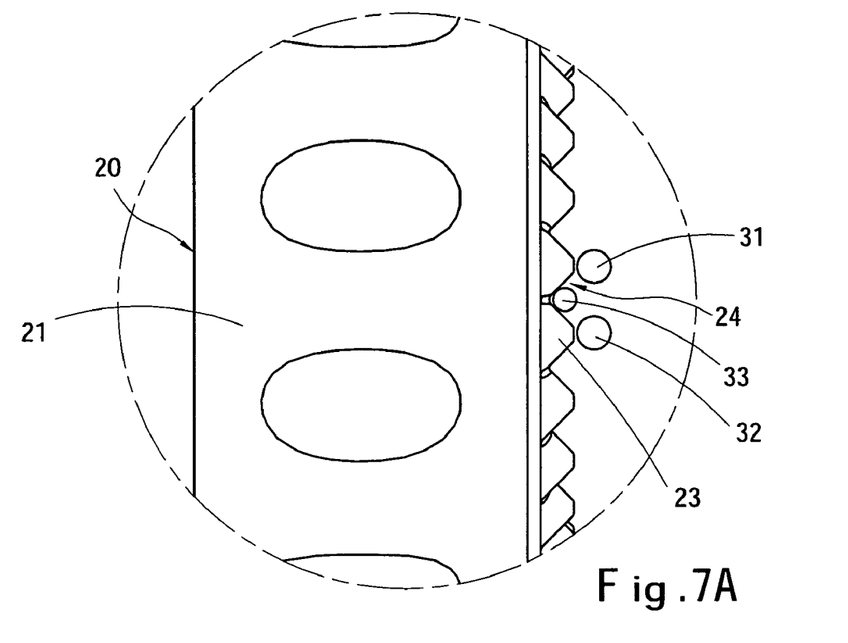
FIGS. 7A, 7B and 7C are schematic views of the invention in rotational movements.
Figure 7B:
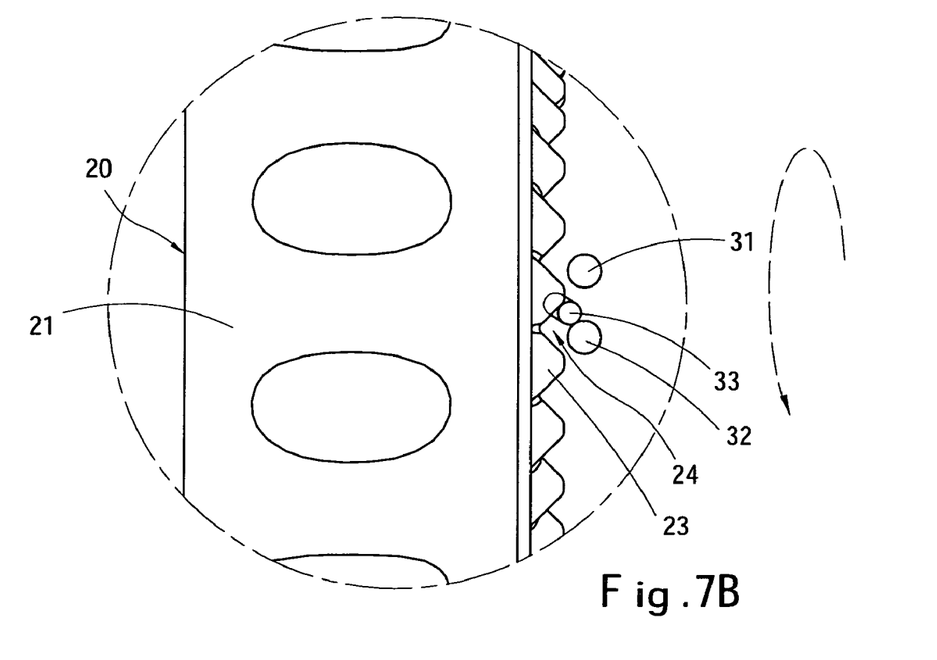
Figure 7C:
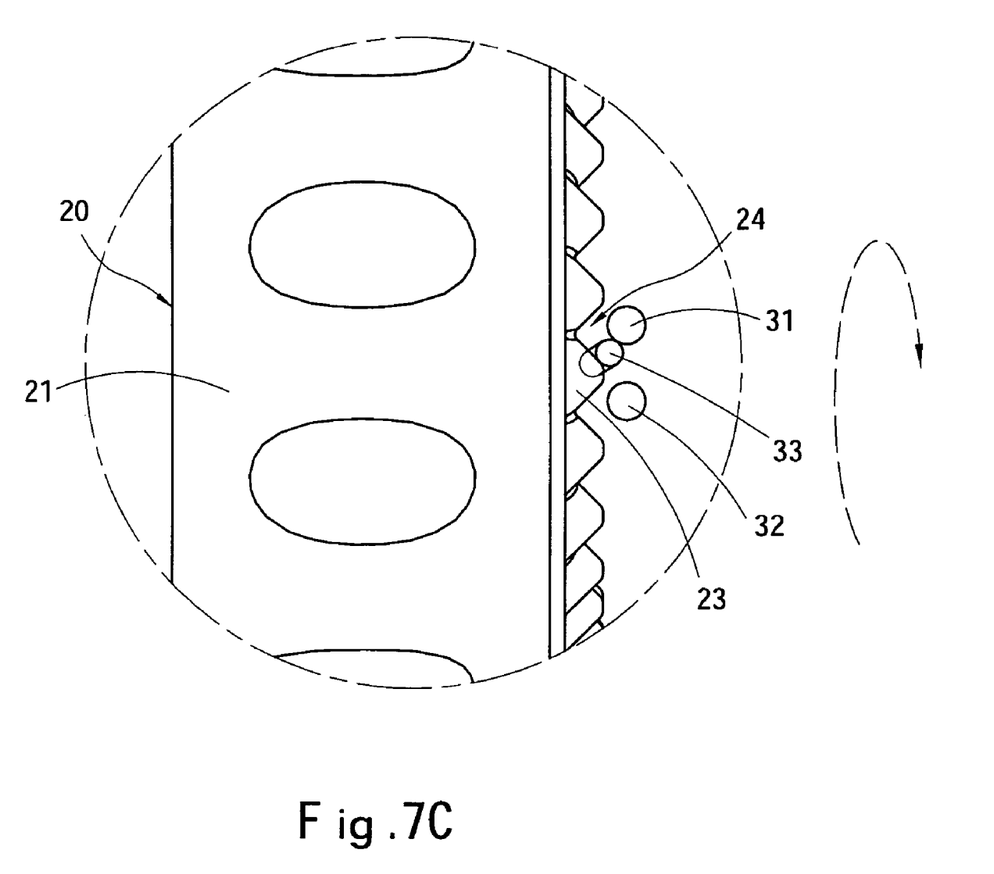

The rotary member 20 is movable for selected displacements when subject to forces, including rotational movement vertical to the bracing seat 10, swaying movements tilting relative to the bracing seat 10 and up and down depressing movements relative to the bracing seat 10. Referring to FIG. 6, the terminal instruction mechanism for the rotational movement includes a common terminal 33, a forward terminal 31 and a reverse terminal 32 located on two sides of the common terminal 33. The rotary member 20 has a rotation side which has concave sections 24 and convex sections 23 formed thereon alternatively. Referring to FIGS. 7A, 7B and 7C, when the rotary member 20 rotates in the forward direction, the convex section 23 pushes the forward terminal 31 to contact the common terminal 33 to generate a forward instruction. When the rotary member 20 rotates in the reverse direction, the convex section 23 pushes the reverse terminal 32 to contact the common terminal 33 to generate a reverse instruction.

Figure 8A:
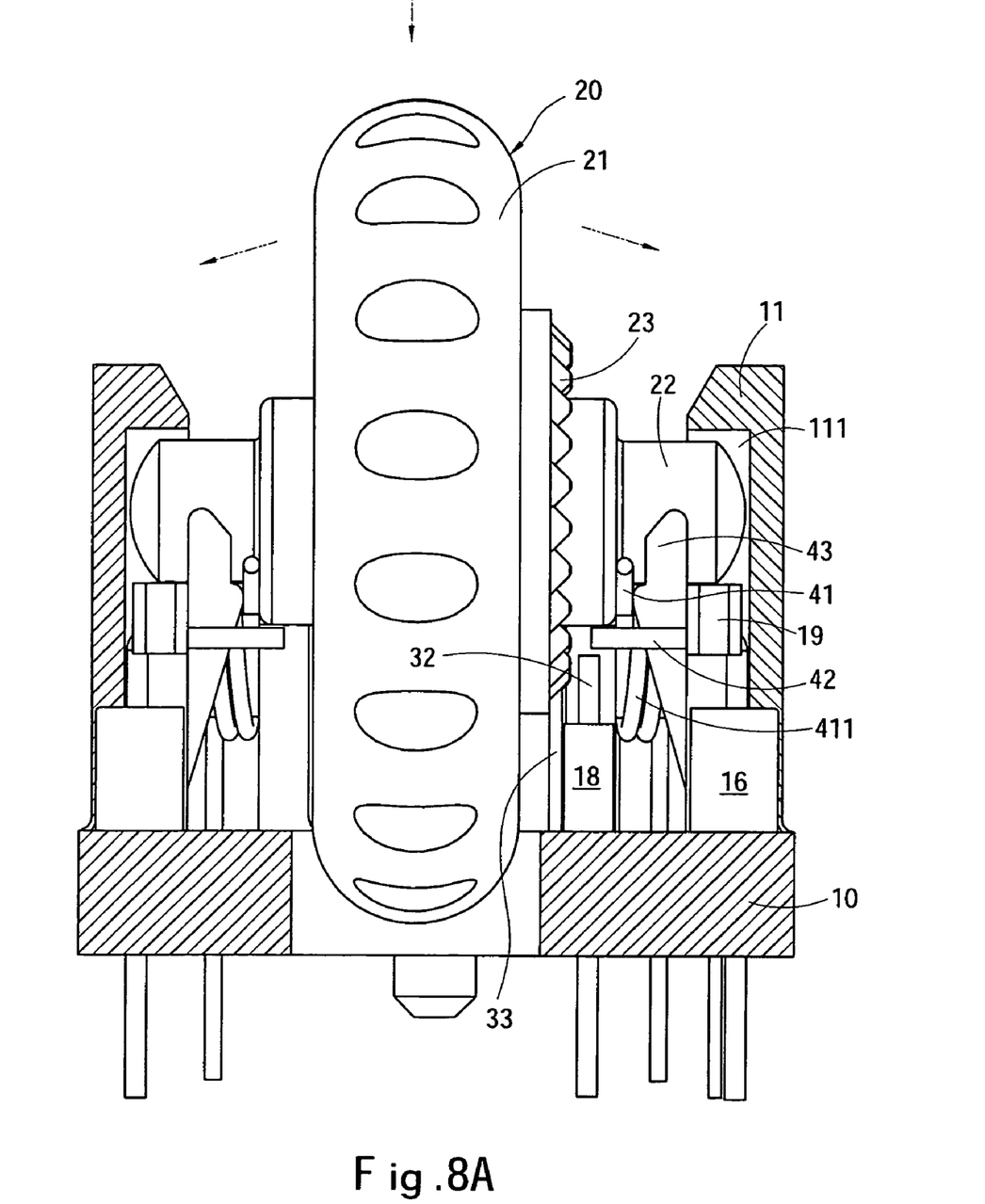
FIGS. 8A, 8B and 8C are schematic views of the invention in swaying and depressing movements.
Figure 8B:
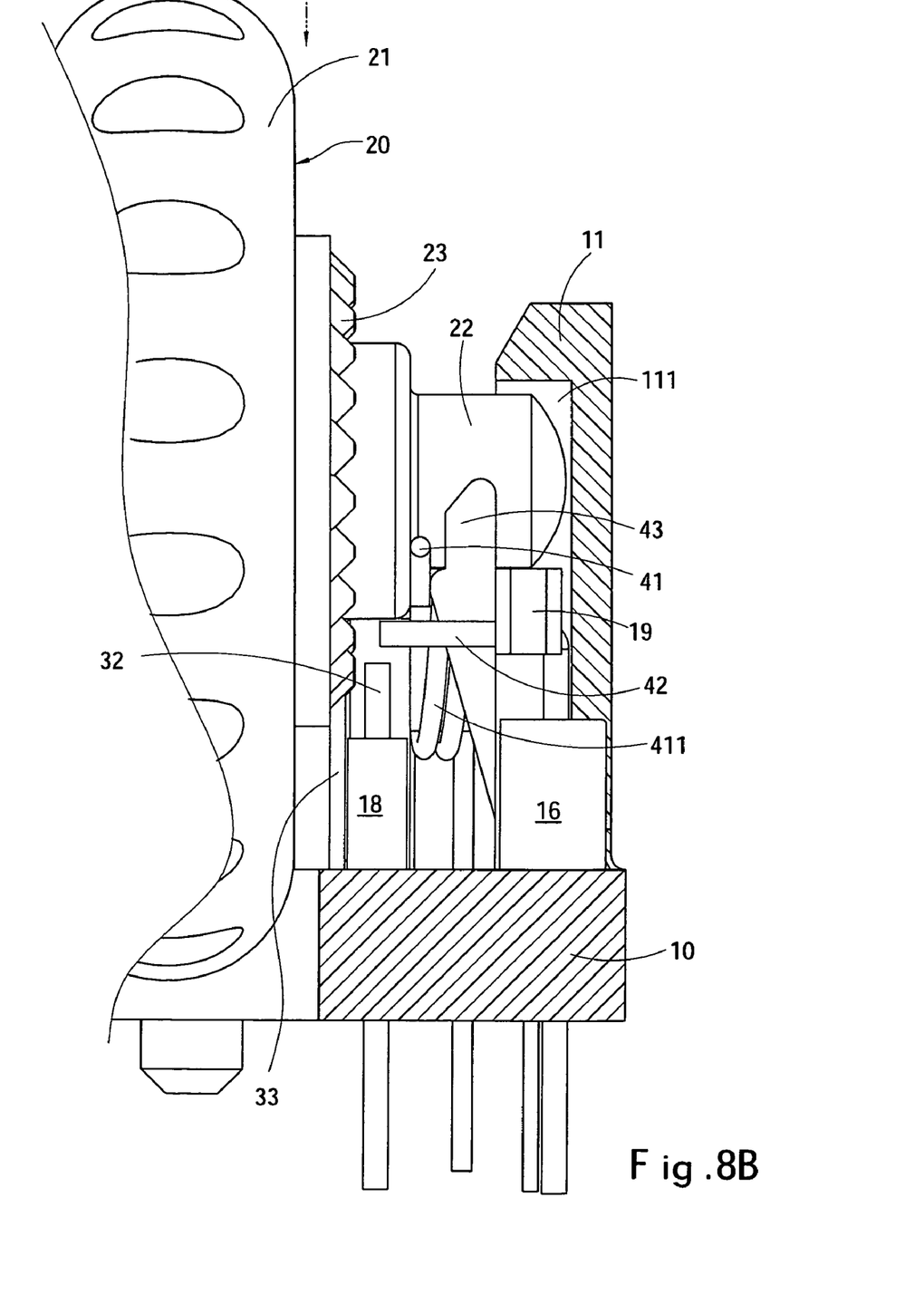
Figure 8C:
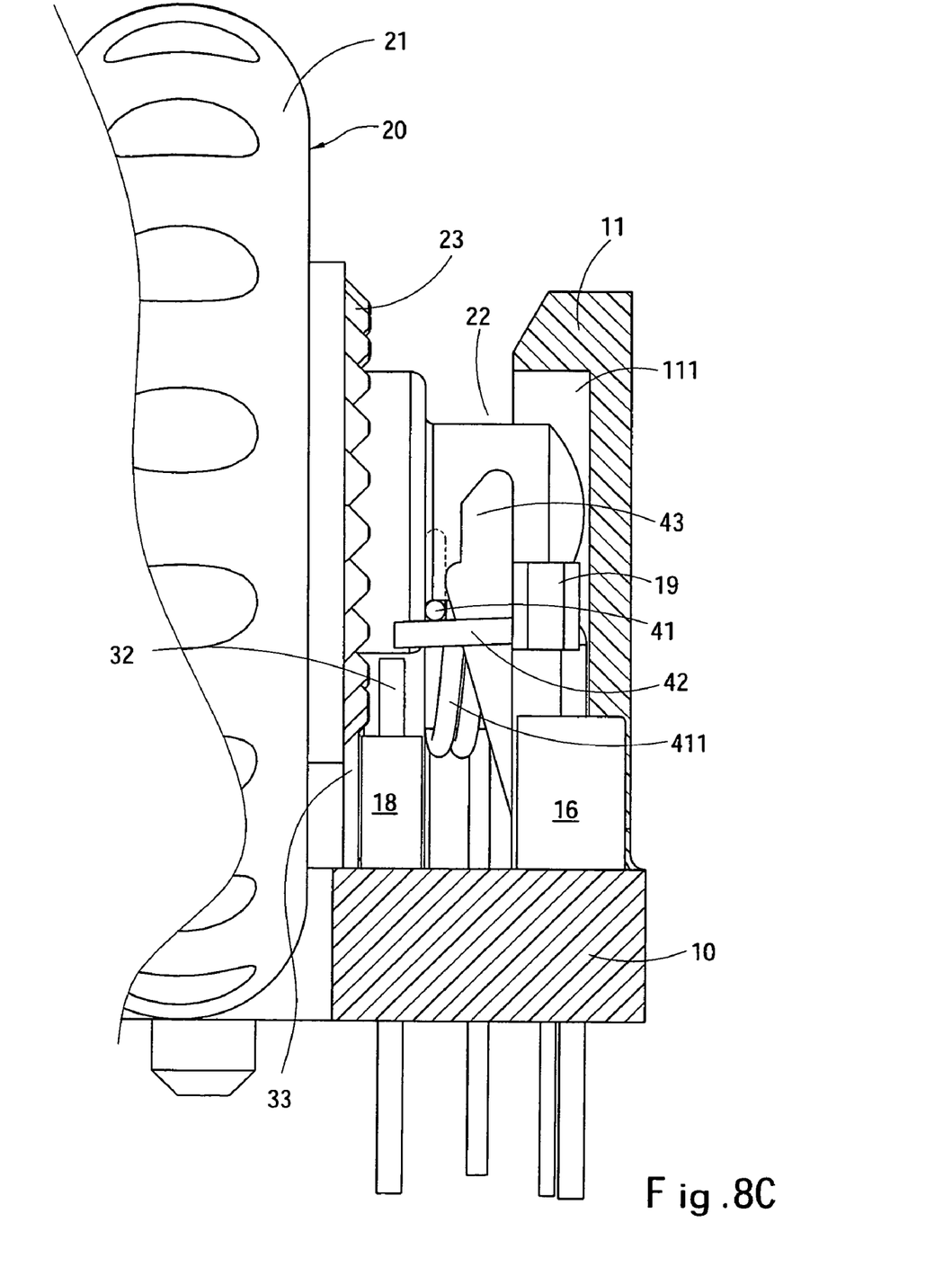

Refer to FIGS. 8A, 8B and 8C for the swaying movement of the terminal instruction mechanism. It includes a first terminal 41 driven by the tilted rotary member 20 and a second terminal 42 within the swaying displacement abutting the first terminal 41. When the rotary member 20 tilts leftwards, it drives the first terminal 41 to contact the second terminal 42 to generate a left direction instruction. When the rotary member 20 tilts rightwards, it drives the first terminal 41 to contact the second terminal 42 to generate a right direction instruction. The rotary member 20 further has a sensing strut 43 located between the first terminal 41 and the second terminal 42. When the rotary member 20 receives a force and moved downwards, the depressing movement occurs. The left direction instruction and the right direction instruction are jointly generating a depressing instruction for the rotary member 20. In addition, whether the rotary member 20 is swayed leftwards or rightwards, or depressed downwards, the sensing strut 43 generates a movement click of the rotary member 20 sensible to users.

The common terminal 33, forward terminal 31, reverse terminal 32, first terminal 41 and second terminal 42 are braced respectively by corresponding anchor sections 13, 14, 15, 16 and 18, and bracing sections 17 and 19 formed on the bracing seat 10 so that each terminal is held firmly. The first terminal 41 further is wound to form an elastic coil section 411 to give the front section of the first terminal 41 located between the coil section 411 and the second terminal 42 an elastic returning force. Thus the first terminal 41 also braces the rotary member 20 to rotate on the bracing seat 10. When the rotary member 20 is tilted and depressed under forces in the swaying displacement and the depressing displacement, the first terminal 41 provides the elastic returning force to restore the rotary member 20 to its original position.

In summary, the present invention can achieve the same function of conventional grating or instruction switch design through a simple mechanical and terminal structure. The terminal instruction mechanism generates a forward instruction and a reverse instruction to control the vertical axis of the display screen to achieve vertical scroll movement of the pictures, and the left direction instruction and the right direction instruction controls the horizontal axis of the display screen to achieve horizontal scroll movement of the pictures. They also may function as special instructions. The depressing instruction may be used as fast instruction or jumping out of the instruction window. Thus the invention can be made in a smaller size and still maintain all the functions of the conventional wheeling mouse 50. And fabrication cost is lower and assembly is easier.

What is claimed is:

1. An input device located in an electronic input equipment, comprising:
   a bracing seat;
   a rotary member held on the bracing seat turnable, tiltable leftwards and rightwards, and movable upwards and downwards relative to the vertical bracing seat for selected displacements; and
   a terminal instruction mechanism mounted onto the bracing seat to receive forces to extend into the displacements having at least two abutting terminals corresponding to the movements of the rotary member to contact with each other to generate instruction signal output;
   wherein the rotary member is turnable in a selected rotational displacement, tiltable in a selected swaying displacement and movable upwards and downwards in a selected depressing displacement; and
   wherein the terminal instruction mechanism in the rotational displacement includes a common terminal, a forward terminal and a reverse terminal located on two sides of the common terminal, the rotation member having a rotation side which has concave sections and convex sections formed thereon alternatively, the convex sections pushing the forward terminal to contact the common terminal to generate a forward instruction when the rotary member turns in a forward direction; the convex sections pushing the reverse terminal to contact the common terminal to generate a reverse instruction when the rotary member turns in a reverse direction.

2. The input device of claim 1, wherein the rotary member includes a wheel and an axle running through the wheel, the bracing seat having two holding sections to hold the axle.

3. The input device of claim 2, wherein the holding sections have respectively a movable trough which has a closed top end.

4. The input device of claim 1, wherein the bracing seat has anchor sections and bracing sections corresponding to the terminals.

5. The input device of claim 1, wherein the terminal instruction mechanism in the swaying displacement includes a first terminal driven by the tilted rotary member and a second terminal in the swaying displacement abutting the first terminal, the first terminal being moved to contact the second terminal to generate a left direction instruction when the rotary member is tilted leftwards; the first terminal being moved to contact the second terminal to generate a right direction instruction when the rotary member is tilted rightwards.

6. The input device of claim 5, wherein the left direction instruction and the right direction instruction jointly generate a depressing instruction of the depressing displacement for the rotary member.

7. The input device of claim 5, wherein the bracing seat has a sensing strut located between the first terminal and the second terminal.

8. The input device of claim 5, wherein the first terminal is wound to form an elastic coil section to provide an elastic returning force for a front section of the first terminal located between the elastic coil section and the second terminal.

9. The input device of claim 5, wherein the first terminal runs though the rotary member to brace the rotary member on the bracing seat.

10. The input device of claim 1, wherein the electronic input equipment is a keyboard.

11. The input device of claim 1, wherein the electronic input equipment is a mouse.

12. An input device located in an electronic input equipment comprising a braced rotary member turnable, tiltable leftwards and rightwards, and movable upwards and downwards relative to the electronic input equipment for selected displacements, and an instruction mechanism located in the selected displacements to receive forces and be driven by the rotary member to generate instructions;

wherein the instruction mechanism has abutting mechanical terminals to contact with each other to generate the instructions;

wherein the instruction mechanism generates a forward instruction and a reverse instruction corresponding to a rotational displacement of the rotary member; and wherein the instruction mechanism includes a common terminal, a forward terminal and a reverse terminal located on two sides of the common terminal, the rotation member having a rotation side which has concave sections and convex sections formed thereon alternatively, the convex section pushing the forward terminal to contact the common terminal to generate a forward instruction when the rotary member turns in a forward direction; the convex sections pushing the reverse terminal to contact the common terminal to generate a reverse instruction when the rotary member turns in a reverse direction.

13. The input device of claim 12, wherein the instruction mechanism generates a left direction instruction and a right direction instruction corresponding to a left tilted and a right tilted displacement of the rotary member.

14. The input device of claim 12, wherein the instruction mechanism generates a depressing instruction corresponding to the upward and downward displacements of the rotary member.

15. The input device of claim 12, wherein the electronic input equipment is a keyboard.

16. The input device of claim 12, wherein the electronic input equipment is a mouse.

* * * * *